(12) United States Patent
Yamaura et al.

(10) Patent No.: US 6,292,107 B1
(45) Date of Patent: Sep. 18, 2001

(54) KEYLESS ENTRY SYSTEM, AND SYSTEM TRANSMITTER HAVING OPTIMIZED SIGNAL TRANSMISSION POWER LEVEL

(75) Inventors: Masafumi Yamaura, Okazaki; Takashi Harada, Hekinan; Tomoyuki Miyagawa, Nukata-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/141,732

(22) Filed: Aug. 27, 1998

(30) Foreign Application Priority Data

Aug. 27, 1997 (JP) .................................................. 9-231102

(51) Int. Cl.[7] .................................................. G08C 19/00
(52) U.S. Cl. .............................. 340/825.69; 340/825.72; 340/5.7
(58) Field of Search .......................... 340/825.31, 825.69, 340/825.72, 825.49, 825.36, 5.7, 5.71, 5.72

(56) References Cited

U.S. PATENT DOCUMENTS

| | | | |
|---|---|---|---|
| 4,797,671 | * | 1/1989 | Toal, Jr. ............................ 340/825.49 |
| 4,881,148 | * | 11/1989 | Lambropoulos et al. ........... 361/172 |
| 5,379,033 | * | 1/1995 | Fujii et al. ....................... 340/825.69 |
| 5,517,189 | * | 5/1996 | Bachhuber et al. ............ 340/825.69 |
| 5,602,535 | * | 2/1997 | Boyles et al. .................... 340/825.31 |

FOREIGN PATENT DOCUMENTS

| | | |
|---|---|---|
| 64-36189 | 2/1989 | (JP) . |
| 8-331656 | 12/1996 | (JP) . |

* cited by examiner

Primary Examiner—Michael Horabik
Assistant Examiner—M Shimizu
(74) Attorney, Agent, or Firm—Pillsbury Winthrop LLP

(57) ABSTRACT

A keyless entry system transmitter that achieves both a reduction in power consumption when transmitting radio signals, and enhances system convenience by boosting transmission power in cases where required. A set-voltage value corresponding to a function specified by operation of an operation switch is read from a corresponding-voltage memory portion, and this read set-voltage value is output to a DAC. Accordingly, when operation specifying the same function is again performed with the operation switch before a predetermined timeout time clocked by a timer has elapsed, a counter is incremented, and a voltage-setting output to the DAC increases in accordance with a count value thereof. As a result, voltage supplied to a transmitter unit through a regulator increases as well. Consequently, transmission power of a remote-control signal sent via a transmission antenna is also increased.

14 Claims, 7 Drawing Sheets

DOOR LOCK/UNLOCK FUNCTION

TRUNK OPEN FUNCTION

KEYLESS ENTRY SYSTEM, AND SYSTEM TRANSMITTER HAVING OPTIMIZED SIGNAL TRANSMISSION POWER LEVEL

CROSS-REFERENCE TO RELATED APPLICATION

This application is based on, and claims priority from, Japanese Patent Application No. Hei 9-231102, filed on Aug. 27, 1997, the contents of which are hereby incorporated by reference.

BACKGROUND OF THE INVENTION

1. Technical Field

This invention relates generally to keyless entry systems, and more particularly to a system that activates a vehicle-mounted light and horn by remote control, that indicates vehicle location, and that generates a warning for repulsing a possible aggressor by, for example, locking or unlocking a door or trunk of a vehicle.

2. Discussion

A conventional keyless entry system locks/unlocks a vehicle door at a site distant from the vehicle, by, for example, remotely operating a door-lock actuator. In this system, when a user operates a transmitter operation switch, radio waves are transmitted from the transmitter, and the radio waves are received by a vehicle-mounted receiver. However, the transmission power of the radio waves is uniform. Therefore, it is necessary to transmit the radio waves within a range of the receiver.

However, a user may not be aware of this distance. Also, the above-described receiver range varies according to surrounding circumstances. Because of this, in a case where the transmitter location is outside the receiver's range, the radio waves are not received when the operation switch is operated, and locking or unlocking of the door cannot be executed. Consequently, it is necessary to approach the vehicle up to the receiver range and again operate the transmitter operation switch.

Constantly boosting the transmission power of the radio waves transmitted from the transmitter may also be considered as a method for solving such problems. In this case, the amount of electrical power that is consumed increases with each transmission. However, such a method wastes power, as the transmitter frequently is operated at a location near the receiver within the receivable range of the receiver.

Additionally, it has recently become possible to also include a trunk-open function, a car-finder function, and a panic function in addition to the above lock\unlock function. A trunk open function allows a user to remotely open a car trunk to facilitate placement/removal of an object into/out of the trunk. A car-finder function enables a user to easily verify the location of his or her vehicle by illuminating a vehicle-mounted light or the like by remote operation in a case where the precise location of his or her vehicle is not known, for example in a situation where many vehicles are parked in a large-scale parking area or at night. A panic function flashes a light or sounds a horn to repulse a potential aggressor or the like, for example in a case where a person is vandalizing the user's vehicle, or a potential aggressor has been discovered near the user's vehicle.

There is a wide range of functions that can be achieved in a keyless entry system in this way, and these are devised so as to be able to be enable at a single transmitter. For example, operation switches of a plurality of types are provided. Even when only a single operation switch is provided, a plurality of functions are discriminated according to an operated state thereof, and a radio signal for a desired function thereof can be generated by the transmitter. These radio waves are received by a vehicle-mounted receiver as was described above. However, because the transmission power of the transmitter is uniform, the distance at which remote operation is possible is the same for any of the above-described plurality of functions, thereby resulting in the following potential problems.

1) Regarding, for example, the above-described trunk-open function, the trunk is usually opened to allow placement of an object in the trunk or to allow removal of an object from the trunk. Therefore, it is sufficient to be able to perform remote operation in the immediate vicinity of the vehicle. However, when operation is possible even at a considerable distance from the vehicle, in a case where the trunk is opened by erroneous operation, the possibility exists that the car may be driven with the trunk still opened. To the contrary, regarding the door-lock/unlock function, even when the door is unlocked due to erroneous operation, the unlocked door is noticed when the user enters the car. Therefore, there is no problem as described above with the trunk.

2) Conversely, in the case of the panic function, it is preferred that operation be possible even at a location distant from the vehicle. This is because panic operation, as was described above, flashes a light or sounds a horn to repulse a potential aggressor, for example in a case where a person is vandalizing the user's vehicle, or when a potential aggressor has been discovered near the user's vehicle. However, when the operating distance thereof is short, the panic function cannot immediately be performed in a case where a potential aggressor has been discovered, and the user must approach to within the operating distance. Because this makes it difficult to adequately enable the panic function, it is preferred that operation be possible even at a location distant from the vehicle. Additionally, it is conceivable that the above-described potential aggressor may retaliate and inflict damage or injury as a result of the panic function having been demonstrated. In order to avoid such a situation, it is preferred that operation be possible from as distant a location as possible.

SUMMARY OF THE INVENTION

Therefore, it is an object of the present invention to both reduce power consumption when transmitting radio waves, and boost transmission power to enable reliable transmission even from a relatively distant location. It is a second object of the present invention to enhance operation of a keyless entry system transmitter in a case of specifying execution of a plurality of functions from a single transmitter by optimizing transmission power corresponding to the functions thereof.

In particular, the present invention provides a transmitter for a keyless entry system that is operative to enable one of a plurality of vehicle-mounted devices each having an associated function. The transmitter includes a switch that enables an operator to select a desired function. A transmitting unit transmits a code identifying the selected function switch operating state. A voltage regulator regulates a power source voltage supplied to the transmitting unit. A controller controls the voltage regulator to cause the power source voltage to vary according to the selected function and the associated switch operating state.

In addition, the present invention provides a method of communicating with a vehicle-mounted receiver to enable a vehicle-mounted apparatus. In the method, a signal including a functional code identifying the vehicle-mounted apparatus, and operation-identifying information identifying a selected operating state, to the receiver, is transmitted. An operating voltage associated with the transmitted signal is then regulated. Finally, the above voltage regulation is controlled in accordance with the functional code and the operation-identifying information.

DETAILED DESCRIPTION OF THE PRESENT INVENTION

Figure 1:
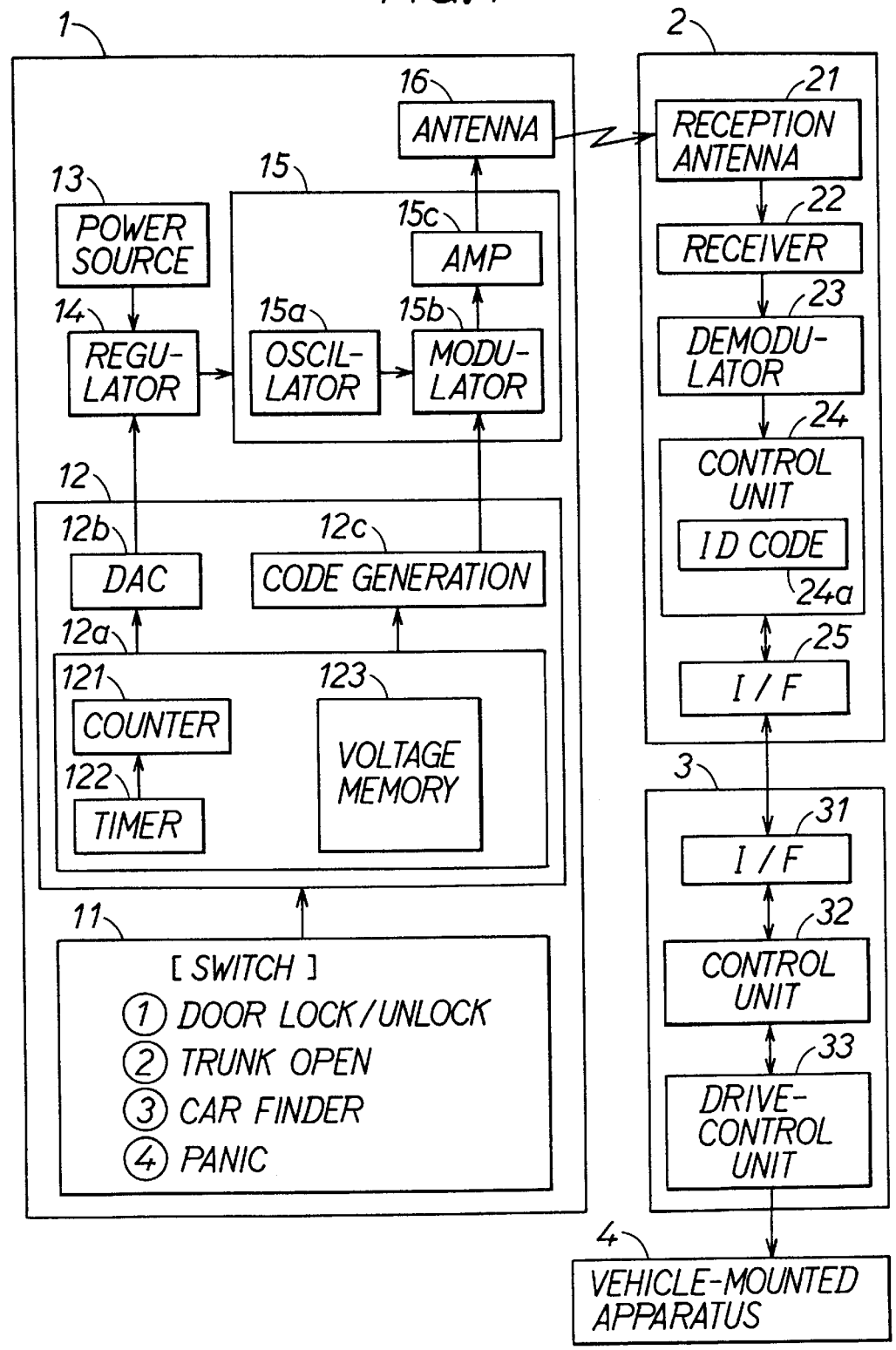
FIG. 1 is a block diagram showing the schematic structure of a keyless entry system according to the present invention in a multi-apparatus wireless vehicle control system.

A first embodiment of this invention will be described hereinafter with reference to the drawings. FIG. 1 is a block diagram depicting the schematic structure of a keyless entry system in a multi-apparatus wireless vehicle control system.

The keyless entry system includes a transmitter 1, a vehicle-mounted receiver 2 to receive signals from the transmitter 1, and an ECU 3 to drive and control a vehicle-mounted apparatus 4 based on information transferred from the receiver 2. The ECU 3 outputs a lock/unlock drive signal, for example, to a door-lock motor disposed in a door, outputs a trunk open drive signal to a trunk-opening motor, or outputs a panic drive signal to activate lights, a bell or a horn, as will be described later.

The transmitter 1 will be described first. The transmitter 1 can be, for example, incorporated within what is termed a master key which a user employs to start an engine and open and close doors of a vehicle. However, in the present embodiment, the transmitter 1 is structured as a dedicated transmitter, and is not incorporated within a master key. The transmitter 1 includes an operation switch 11, a controller 12, a power-source unit 13, a regulator 14, a transmitter unit 15, and a transmission antenna 16. With this embodiment, four functions can be specified via the operation switch 11, namely 1) a door-lock/unlock function, 2) a trunk-open function, 3) a car-finder function, and 4) a panic function. These functions will be described in detail later.

The controller 12 is provided with a control unit 12a, a digital-analog converter (DAC) 12b, and a code-generation unit 12c. The control unit 12a monitors the operation state of the operation switch 11 and determines which of the above-described functions has been selected, or, in a case where an operation is continued, the control unit also determines the number of repetitions of operation thereof. Accordingly, this embodiment is devised to execute a control function for including predetermined information in a remote-control signal, and a control function relating to the transmission power of the remote-control signal.

The control function for including predetermined information in the remote-control signal will be described first. The control unit 12a determines which function has been selected from the operation state of the operation switch 11, and instructs the code-generation unit 12c to include a function code corresponding to the selected function in the remote-control signal. The code-generation unit 12c adds an ID code to the instructed signal indicating that the remote-control signal to be sent contains a code specific to this transmitter, and then outputs the resulting code to the transmitter unit 15. The transmitter unit 15 includes an oscillator unit 15a, a modulator unit 15b, and an amplifier unit 15c. The modulator unit 15b modulates the high-frequency signal output from the oscillator unit 15a based on the code output from the code-generation unit 12c. The modulated signal is amplified by the amplifier unit 15c and transmitted via the transmission antenna 16 as the remote-control signal.

The control function relating to transmission power of the remote-control signal will be described next. This control function is of two types. One type corresponds to "number of repetitions of operation" with respect to the operation switch 11, while the other type corresponds to the "function" specified by the operation state with respect to the operation switch 11. The content of this control function will be described in detail later with reference to the flow diagrams of FIGS. 2 and 4, but will be described briefly hereinafter in order to describe structure.

In the structure shown in FIG. 1, a characteristic structure relating to the control function corresponding to "number of repetitions of operation" is a counter 121 and a timer 122 within the control unit 12a. This control function starts the timer 122, in a case of operation of the operation switch 11 specifying a particular function, to increment the counter 121 during a repeated operation input specifying the same function until the timer 122 reaches a predetermined value. The control function then raises a set voltage output from the DAC 12b in accordance with the counter value thereof.

Meanwhile, a characteristic structure relating to a control function corresponding to "function" in the structure shown in FIG. 1 is a voltage memory portion 123 within the control unit 12a. Herein are stored set-voltage values corresponding respectively to the above-described four functions, namely 1) the door-lock/unlock function, 2) the trunk-open function, 3) the car-finder function, and 4) the panic function. This control reads from the corresponding voltage memory portion 123 the set-voltage value corresponding to the function specified by the operation switch 11, and outputs this set-voltage value to the DAC 12b.

In this way, voltage-setting output from the DAC 12b to the regulator 14 varies according to the above-described "number of repetitions of operation" and "function." The regulator 14 receives the power-source supply from the power-source unit 13 and outputs voltage corresponding to the voltage-setting output from the controller 12 to the transmitter unit 15. Consequently, the voltage supplied to the transmitter unit 15 varies according to the "number of repetitions of operation" and the "function." In accompaniment thereto, the transmission power of the remote-control signal sent from the transmitter 1 changes as well.

The receiver 2 will be described next. The receiver 2 is provided with a reception antenna 21, a receiver unit 22, a demodulator unit 23, a control unit 24, and a communication interface 25. The remote-control signal sent from the transmitter 1 is received by the receiver unit 22 through the reception antenna 21. After being demodulated by the demodulator unit 23, the signal is converted to a digital signal and input to the control unit 24. The control unit 24 is structured as an ordinary computer and includes a CPU, ROM, RAM, and I/O of known art, as well as bus lines connecting these structures. The control unit 24 extracts the ID code included in the remote-control signal input from the demodulator unit 24, and determines whether this ID code matches an internally stored ID code for determination use 24a. Only in a case where the two ID codes match is the functional code in the remote-control signal output to the ECU 3 through the communication interface 25.

The ECU 3 will be described next. The ECU 3 includes a communication interface 31, a control unit 32, a drive-control unit 33, and so on. A functional code output from the receiver 2 is input to the control unit 32 through the communication interface 31. The control unit 32, which is structured as an ordinary computer and is provided internally with a CPU, ROM, RAM, and I/O of known art, as well as bus lines connecting these structures. The control unit 32 sends instructions to the drive-control unit 33 to cause the vehicle-mounted apparatus 4 to assume a predetermined state based on a functional code. The drive-control unit 33 outputs a drive signal to the vehicle-mounted apparatus 4 based on the instruction from the control unit 32. For example, when the vehicle-mounted apparatus 4 is an unlocking motor, a drive lock\unlock signal is output.

Operation in the system will be described next, centering on operation at the transmitter 1 in particular. As was mentioned above, control functions relating to the transmission power of the remote-control signal which the transmitter 1 executes is of two types, namely "number of repetitions of operation" and "function." Consequently, these will be described in sequence with reference to the drawings.

Figure 2:
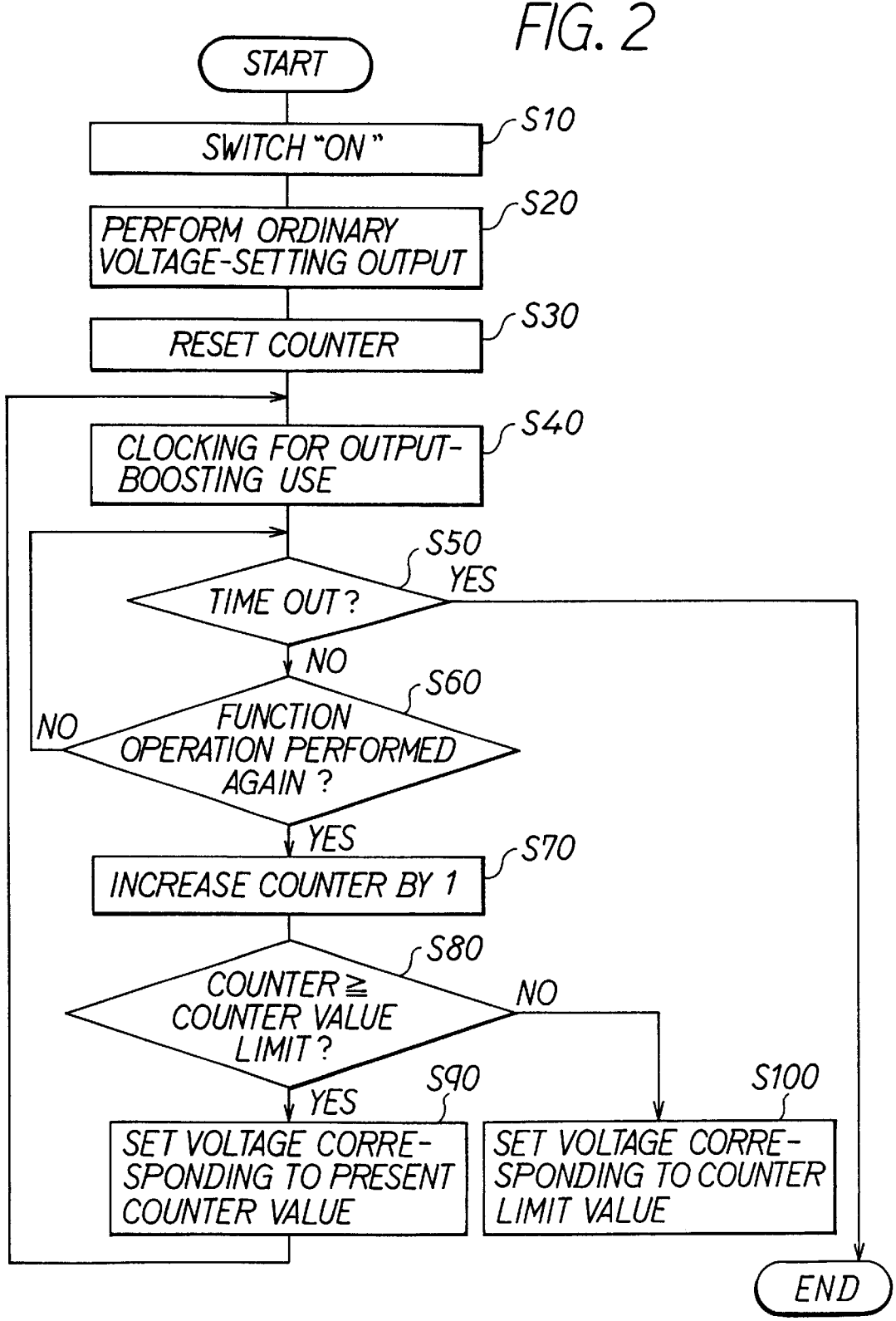
FIG. 2 is a flow diagram showing processing relating to control corresponding to number of repetitions of operation, the processing executed by a control unit of a transmitter.

FIG. 2 is a flow diagram showing processing relating to "control corresponding to number of repetitions of operation" executed by the control unit 12a of the controller 12.

When the operation switch 11 is switched on (S10), ordinary voltage-setting output to the DAC 12b is performed (S20). This ordinary voltage-setting output reads from the corresponding-voltage memory portion 123 the set-voltage value corresponding to the function specified by operation of the operation switch 11, and outputs this set-voltage value that has been read to the DAC 12b.

The counter 121 is then reset (S30), and clocking by the timer 122 for signal output-boost use is started (S40). Next, in S50, it is determined whether a timeout has occurred, and, until a timeout occurs (S50: NO), it is determined in S60 whether operation specifying the same function has again been performed with the operation switch 11. In a case where operation specifying the same function has again been performed with the operation switch 11 (S60: YES), operation is transferred to S70. In a case where operation has not been performed again (S60: NO), execution returns to S50. In a case where a timeout has occurred before operation is performed again (S50: YES), this processing ends without further execution, and the function voltage returns to a default level.

Meanwhile, when operation is performed again before a timeout occurs and execution is transferred to S70, in S70 the counter 121 is incremented. That is to say, the counter value indicates the number of repetitions of the same operation. Next, in S80, it is determined whether the present counter value less than a limit counter value indicating an predetermined upper limit. When the present counter value is less than the limit counter value (S80: YES), execution is transferred to S90 and voltage-setting output corresponding to the present counter value is performed. Thereafter, execution returns to S40.

That is to say, ordinary voltage-setting output corresponding to the initial operation is performed in S20, but when a further repetition of the same operation is performed, the counter value is adjusted to correspond to the number of repetitions thereof. Therefore, a voltage-setting output increased by an amount equal to the counter value is performed. However, the increase is not performed without limit, and in a case where the counter value incremented in S70 exceeds the limit counter value (S80: NO), execution is transferred to S100, and voltage-setting output corresponding to the limit counter value is performed. In this case, because the limit counter value has been reached, no correspondence is required, even if further operation is performed thereafter. Therefore, the processing ends without further execution.

In this way, when the number of operations of the operation switch 11 increases, voltage-setting output to the DAC 12b increases in correspondence thereto. As a result, the voltage supplied to the transmitter unit 15 through the regulator 14 increases as well. Consequently, the transmission power of the remote-control signal sent through the transmission antenna 16 increases as well.

Figure 3:
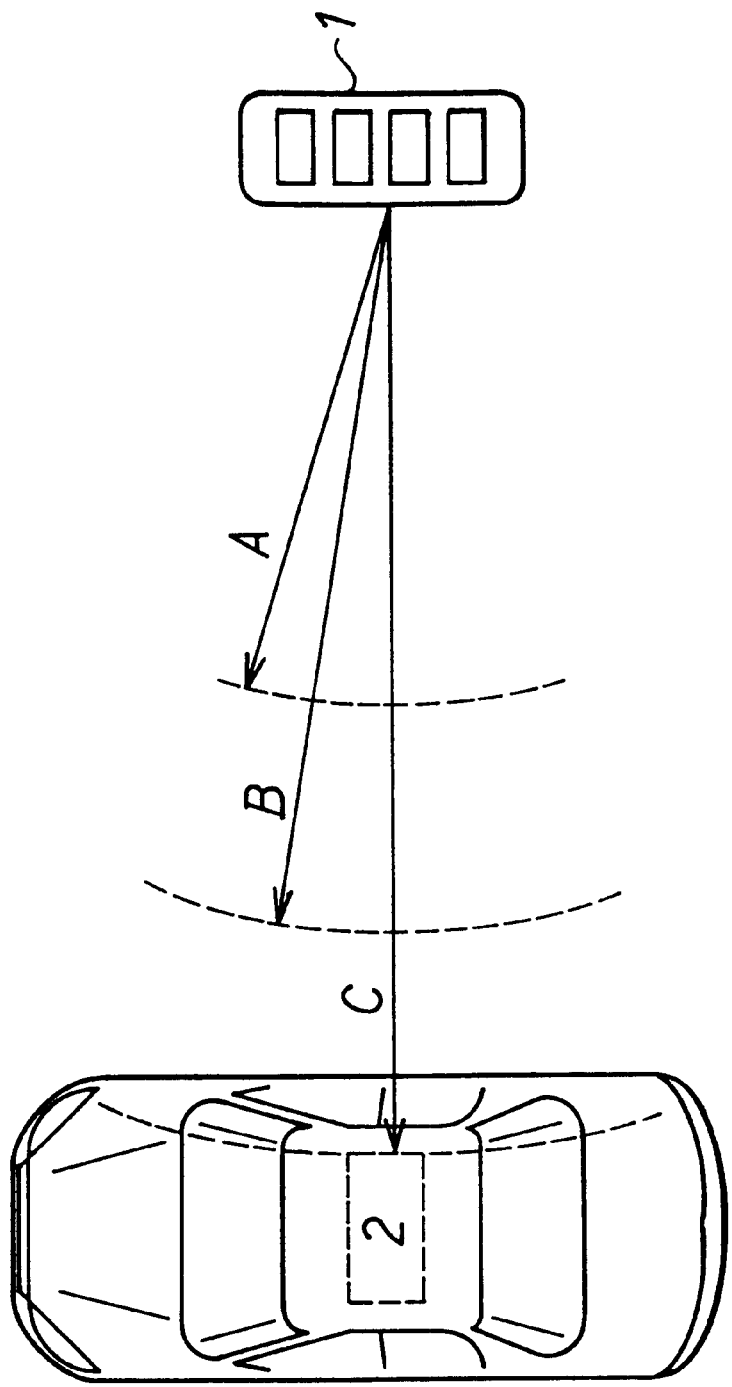
FIG. 3 is an explanatory diagram showing change in transmission power due to control corresponding to number of repetitions of operation.

For this reason, in a case where the location of the transmitter 1 relative to the receiver 2 is more distant than a maximum range A of the remote-control signal due to a transmission power level during ordinary operation, as shown for example in FIG. 3, the location of the transmitter 1 relative to the receiver 2 comes to be beyond the receivable range at the receiver 2 in a case where referenced on the transmission power at that time, no matter how many remote-control signals are sent. In the case of a transmitter according to the related art, when no signal was received despite the operation switch 11 having been operated in this way, the user himself or herself had to approach the receiver until within an operable transmission range, and again operate the transmitter's operation switch. However, with the present transmitter 1, such a problem can be eliminated. That is to say, in a case where the operation switch 11 is operated once but the desired function, for example door unlocking, is not achieved, when the same operation is performed again, a maximum range B (B>A) of the remote-control signal is set. Accordingly, when the remote-control signal is still not received, when the same operation is performed yet again a maximum range C (C>B) of the remote-control signal is set. In this way, when the number of repetitions of an operation is increased until the desired function is achieved, it becomes unnecessary to approach the vehicle, and system convenience is enhanced. The extent to which the maximum range is extended with the first repetition of the operation may be suitably set in view of usage, ease of use, and other operating parameters. For example, it is thought that extension by a short distance of about 10 cm at a time is not very effective, and extension by about 50 cm to 1 m is practical. The maximum range may be increased, for example, in the sequence of A (2 m)→B (2.5 m)→C (3 m).

It may be noted that, for example, constantly boosting the transmission power of the radio waves sent from the transmitter 1 may also be considered. As an example, when speaking of the example shown in FIG. 3, the setting is made so that the maximum range C is always obtained. Electrical power consumed with each transmission increases relatively in this case. However, considering that the operation switch 11 of the transmitter 1 frequently is operated at a location near the receiver 2, and circumstances are not always of operation beyond the receivable range of the receiver 2, power is unnecessarily consumed, and the useful life of the battery is thus shortened. Consequently, it is preferred that transmission power be increased only in required cases, as with the present transmitter 1.

That is to say, this transmitter 1 both reduces power consumption when transmitting a radio signal, and enhances system convenience by boosting transmission power in cases when necessary, to enable reliable transmission even from a relatively distant location.

Because it is necessary to repeat operation and input of the same function in a case when a desired function is not achieved, as was described above, provision of five operation elements, such as for example door-lock, door-unlock, door-open, car-finder, and panic, may be considered. In some conventional transmitters, door locking or door unlocking can be specified with a single operation element in an alternating manner. However, this is not suitable for continuously performing operation input for the same function as with the present invention. Of course, the operation element itself is dual use, and it is therefore sufficient to adopt a structure which discriminates by causing the operation-input method thereof to be different.

With the present embodiment, as shown in the flow diagram of FIG. 2, when repeated operation of the operation switch 11 is not performed within a predetermined time, a timeout is determined to have occurred (S50: YES), and an increase in transmission power corresponding to the number of repetitions of operation is not performed. This timeout enables the present invention to distinguish whether operation was repeated because a desired function was not achieved, or whether, completely irrespectively thereto, the desired function was newly specified. For this reason, the number of operational repetitions is accumulated solely in a case where operation was performed within the predetermined time. That is to say, in a case where operation was performed again because the desired function was not achieved, it is usual to perform operation immediately, and so determination of such a situation is made based on the operation interval.

In S50 of FIG. 2 it was determined whether a timeout had occurred. The determination of timeout may be one of two types. Namely, the determination may be a method that assumes a timeout when a predetermined time has elapsed with no further operation after the initial operation, or it may be a method that assumes a timeout in a case where a predetermined time has elapsed regardless of whether operation was performed. For example, to consider a specific example of the former case, a timeout may be assumed to occur in a case where the same operation is not performed within three seconds after an operation is initially performed. In this case, it is necessary to reset a timer when an operation is performed once. Meanwhile, as a specific example of the latter case, a timeout may unconditionally be assumed to occur when ten seconds has elapsed regardless of whether operation was performed during the course thereof. In either case, the function voltage returns to a default level after the timeout.

Additionally, this embodiment is based on the "number of repetitions of operation," but it is also possible to change the operation method of the operation switch 11 to increase transmission power in correspondence with the operation continuation time of the operation switch. For example, the operation switch is switched on, and operation is determined to have been performed again each time the "on" state continues for a performed unit time (for example 1 second). This continuation time of one second is merely one example and may be suitably varied and established, but must be set at a time which is longer than a time wherein the user himself or herself can ascertain that, after the user has operated the operation switch 11, a remote-control signal corresponding to the operation thereof has been sent and received by the receiver 2, and the vehicle-mounted apparatus 4 has operated. That is to say, because there is a time period required for one operation even within the receivable range, there is no need to boost the transmission power within this time period. In a case where the desired function is not achieved even after this predetermined time period has elapsed, the user continues to operate the operation switch 11, and the transmitter 1 can accurately ascertain the need to raise the transmission power.

Even in a case where transmission power is increased in correspondence with either the number of repetitions of operation or the operation continuation time of the operation switch 11, increasing the transmission power in an unrestricted manner is not preferred. Consequently, the present embodiment ensures that the limit counter value is not exceeded, as shown in S80 of FIG. 2.

Figure 4:
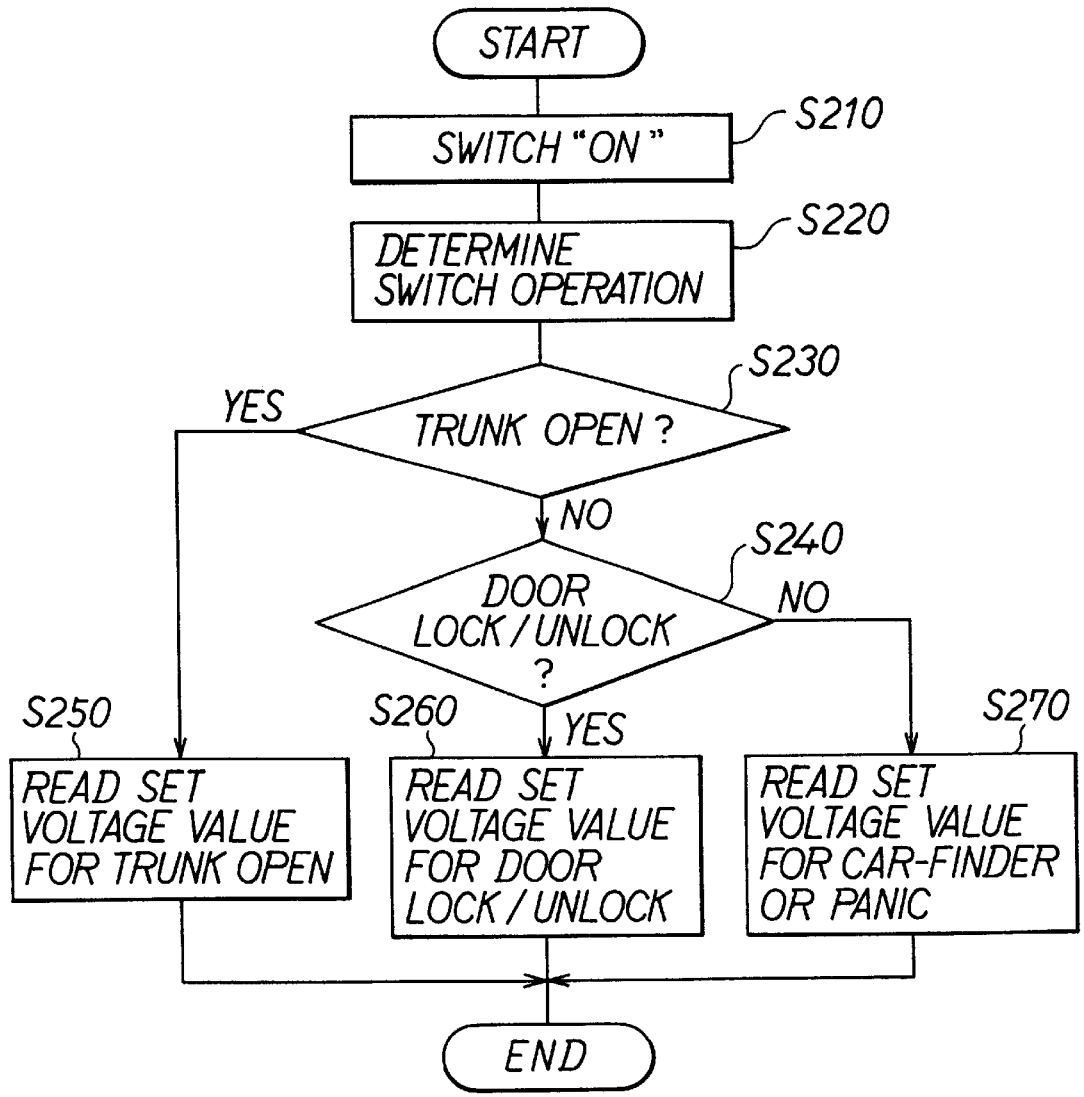
FIG. 4 is a flow diagram showing processing relating to control corresponding to function, with processing executed by a control unit of a transmitter.

FIG. 4 is a flow diagram showing processing relating to "control corresponding to function" executed by the control unit 12*a* of the controller 12.

When the operation switch 11 is switched on (S210), it is determined which type of operation element has been operated. For example, when the operation switch 11 is provided with five operation elements for door-lock, door-unlock, trunk-open, car-finder, and panic use, it is determined which thereamong has been operated.

Accordingly, in subsequent S230, it is determined whether a button for opening the trunk has been operated based on the determination result of S220. In a case where the button for opening the trunk has been operated (S230: YES), execution is transferred to S250, the set-voltage value corresponding to the trunk-open function is read from the corresponding-voltage memory portion 123, and this set-voltage value is output to the DAC 12*b*.

Meanwhile, in a case where the button for opening the trunk has not been operated (S230: NO), it is determined whether either a button for locking the door or a button for unlocking the door has been operated (S240). Accordingly, in a case where either the button for locking the door or the button for unlocking the door has been operated (S240: YES), execution is transferred to S260, the set-voltage value corresponding to the door-lock/unlock function is read from the corresponding-voltage memory portion 123 and then output to the DAC 12*b*. That is to say, either in a case where the button for locking the door has been operated, or in a case where the button for unlocking the door has been operated, the door-lock/unlock functions are treated as a single function, and the set-voltage value is identical.

Further, in a case where neither the button for locking the door nor the button for unlocking the door has been operated (S240: NO), either a button for car-finder use car or a button for panic use has been operated. Therefore, execution is transferred to S270, the set-voltage value corresponding to the car-finder or panic function is read from the corresponding-voltage memory portion 123, and the set-voltage value is output to the DAC 12*b*.

In this way, the voltage-setting output to the DAC 12b can be increased in correspondence with the function specified by the user's operation of the operation switch 11. As a result, the voltage supplied to the transmitter unit 15 through the regulator 14 increases or decreases as well, and the transmission power of the remote-control signal sent via the transmission antenna 16 increases or decreases as well. With this embodiment, this size relationship is (setting voltage corresponding to the trunk-open function)<(setting voltage corresponding to the door-lock/unlock function)<(setting voltage corresponding to the car-finder or panic function).

For this reason, the remote-control signal for a particular function can be controlled to be sent at a transmission power and to be received solely in a case when the transmitter is considerably close to the receiver 2. That is, the vehicle whereon the receiver 2 is disposed, and the remote-control signal for a particular function can be controlled so as to be sent at a transmission power that is received even when the transmitter is comparatively distant from the vehicle. Consequently, in a case where specifying the execution of a plurality of functions with a radio-wave transmission from a single transmitter, the optimal transmission power corresponding to each of these functions can be obtained, thereby enhancing system convenience.

Figure 5:
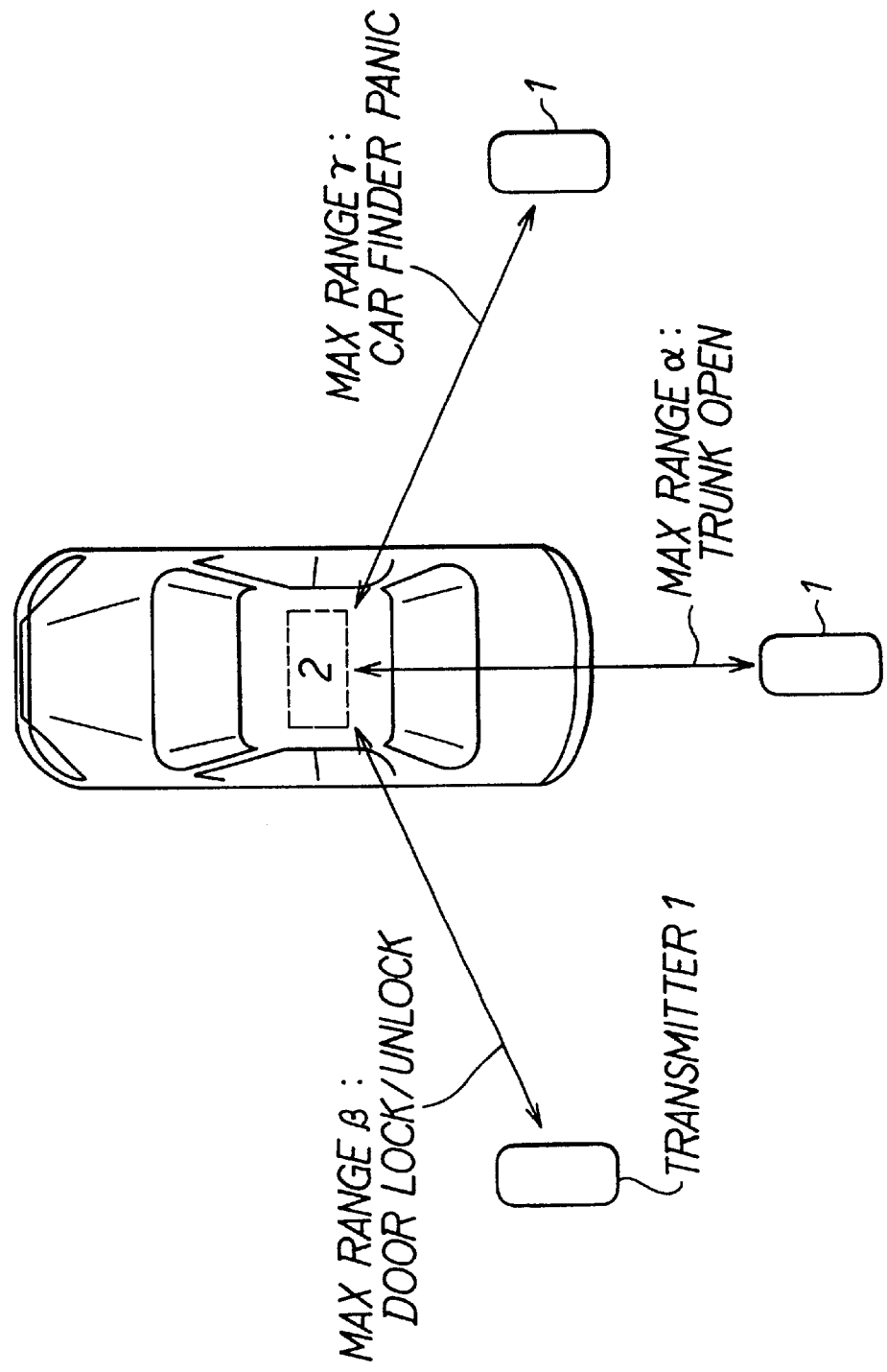
FIG. 5 is an explanatory diagram showing change in transmission power due to control corresponding to function.

For example, with the present embodiment, three types of voltage-setting output functions can be performed as shown in S250, S260, and S270 in the flowchart of FIG. 4, and remote-control signals can be sent with three types of transmission power. As a result, when the maximum range of the remote-control signal from the transmitter 1 during trunk-open operation is taken to be $\alpha$, the maximum range of the remote-control signal from the transmitter 1 during door-lock/unlock operation is taken to be $\beta$, and the maximum range of the remote-control signal from the transmitter 1 during car-finder or panic operation is taken to be $\gamma$, a relationship of $\alpha<\beta<\gamma$ can be established, as shown in FIG. 5.

The above establishment of distances is performed with consideration given to the functional content of each signal. Consequently, specific operation of the several functions will be described with respect to FIGS. 6–9, and consideration upon which these functions are established will be described.

(1) Door-lock/unlock function

Figure 6:
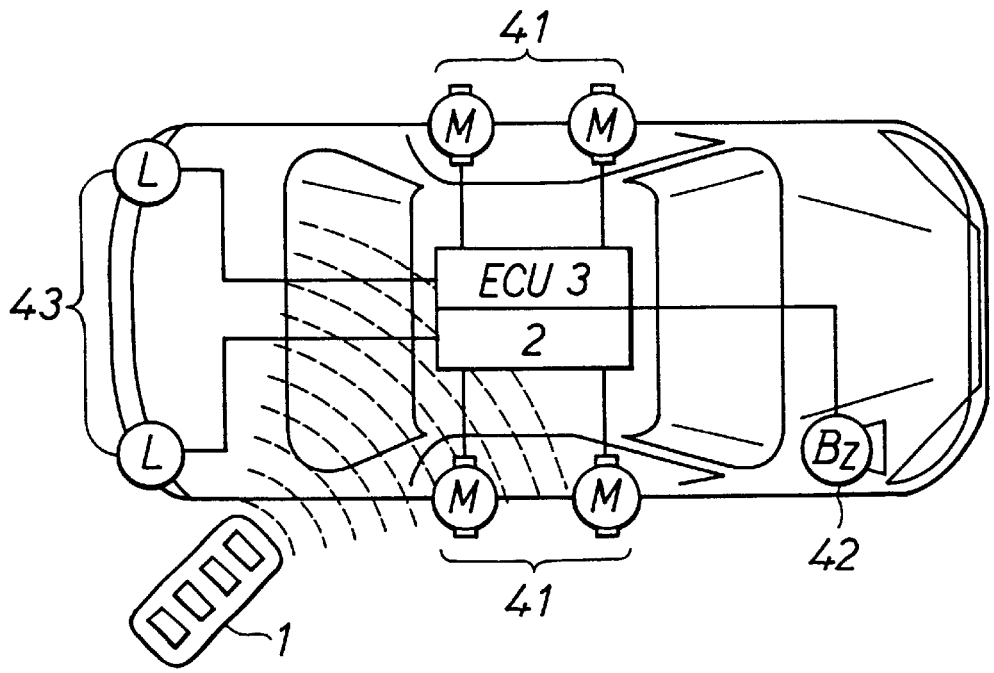
FIG. 6 is an explanatory diagram of a door-lock/unlock function.

The content of the lock/unlock function will be described hereinafter in specific terms. As shown in FIG. 6, the ECU 3 receives a functional code which is included in a remote-control signal received from the transmitter 1. When this functional code specifies locking of the door, the ECU 3 issues a drive signal to operate a door-lock motor 41. When the ECU 3 verifies that the door-lock motor 41 operated normally and the door was locked, the ECU 3 sounds a bell 42 for a brief interval and illuminates taillights 43 for a brief interval to inform the user that door locking has been successfully performed. The case of door unlocking as well is similar, and herein a drive signal is issued to operate the door-lock motor 41 toward unlocking. When the ECU 3 verifies that the door-lock motor 41 operated normally and the door was unlocked, the ECU 3 sounds the bell 42 for a brief interval and illuminates the taillights 43 for a brief interval to inform the user that door locking has ended normally.

This function exists at an initial stage in a case where a keyless entry system is applied in a vehicle. When this function is, for example, the door-unlock function, it is sufficient to operate the function at a time when the vehicle has been approached at a certain distance. Conversely, when door is unlocked at a time when the transmitter is located at an overly remote distance, there also exists danger that a potential aggressor lying in wait near the vehicle may open the unlocked door and enter and steal the vehicle.

For this reason, operation at a overly remote distance may be counterproductive. Consequently, with this embodiment, the distance is greater than that associated with the trunk function, and is shorter than that associated with the car-finder function and the panic function. An upper limit or a lower limit, which is to a certain extent preferred, may clearly be established in setting the distance in the case of the trunk function, the car-finder function, and panic function. However, for the distance in the case of the door-lock/unlock function, consideration is given to the point that neither an overly short distance nor an overly lengthy distance is preferred.

(2) Trunk-open function

Figure 7:
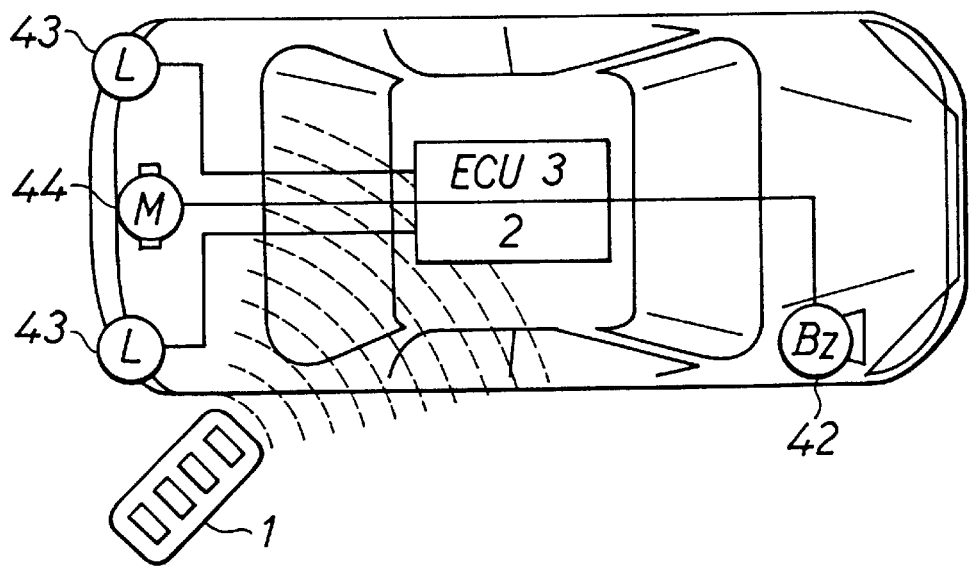
FIG. 7 is an explanatory diagram of a trunk-open function.

The content of the trunk-open function will be described hereinafter in specific terms. As shown in FIG. 7, the ECU 3 receives a functional code which is included in a remote-control signal received from the transmitter 1. When this functional code specifies opening of the trunk, the ECU 3 issues a drive signal to a trunk-opening motor 44 to release a lock and open the trunk. When the ECU 3 verifies that the trunk-opening motor 44 operated normally and that the trunk did in fact open, the ECU 3 sounds the bell 42 for a brief interval and illuminates the taillights 43 for a brief interval to inform the user that trunk opening has been successfully completed.

In the case of the trunk-open function, when the trunk has been opened, action to place an object in the trunk or remove an object from the trunk may be performed immediately thereafter. Therefore, it is sufficient to be able to perform remote operation in the immediate vicinity of the vehicle. That is to say, from a practical standpoint there is little need to open the trunk at a lengthy distance from the vehicle, and so operation at a close distance of, for example, 1 m or less is sufficient. Conversely, when operation is possible even at a considerable distance from the vehicle, in a case where the trunk is opened because of erroneous operation or the like, the possibility exists that the car may be driven off without it being noticed that the trunk has been opened. Consequently, operation at a close distance permitting adequate attention to the trunk is preferred.

(3) Car-finder function

Figure 8:
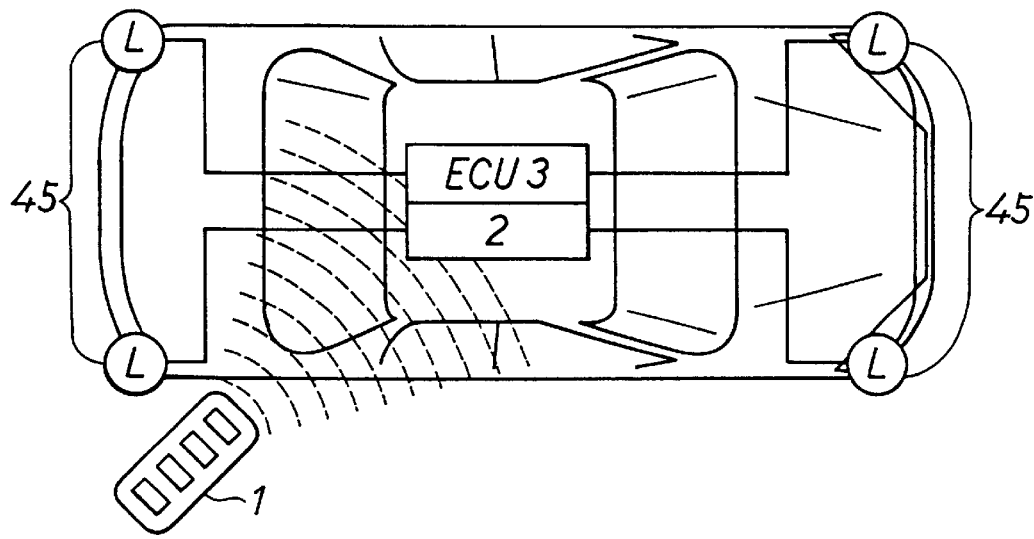
FIG. 8 is an explanatory diagram of a car-finder function.

The content of the function car-finder function will be described hereinafter in specific terms. As shown in FIG. 8, the ECU 3 receives a functional code which is included in a remote-control signal received from the transmitter 1. When this functional code specifies finding the car, the ECU 3 illuminates vehicle lights, such as the turn-signal lights 45, at the front and rear of the vehicle to inform the user of the vehicle's location.

This car-finder function enables a user to easily verify the location of his or her vehicle in a case where the precise location of his or her vehicle is not known, for example in a situation where many vehicles are parked in a large-scale parking area, or at night. In this case, effectiveness of the object thereof is not obtained unless operation is possible at a certain distance from the vehicle.

(4) Panic function

Figure 9:
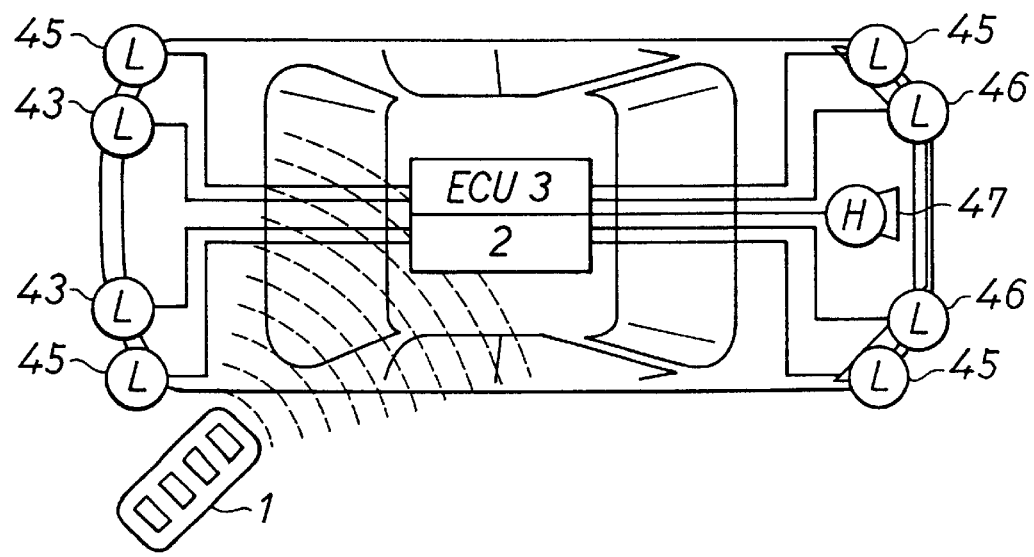
FIG. 9 is an explanatory diagram of a panic function.

The content of the panic function will be described hereinafter in specific terms. As shown in FIG. 9, the ECU 3 receives a functional code which is included in a remote-control signal from the receiver 2 received from the transmitter 1. When this functional code specifies panic, the ECU 3 illuminates (or flashes) vehicle lights such as the tail lights 43, the turn-signal lights 45, and headlights 46. Also, the ECU continuously (or intermittently) sounds a vehicle horn or a horn for security use 47. The combination of output and the operating pattern of these lights 43, 45, and 46 and this horn 47 may vary according to the country depending on relevant regulations.

The above-described panic function is for repulsing a potential aggressor, such as a person who is vandalizing the user's vehicle, or a potential aggressor who has been discovered near the user's vehicle. The panic function aims to startle a vandal or a potential aggressor, or cause the vandal or the potential aggressor to flee, by illuminating (or flashing) the lights 43, 45, and 46 and sounding the horn 47. In this case, when the operable distance thereof is short, the panic function cannot immediately be specified in a case where a potential aggressor has been discovered, and the user himself or herself must approach to within the operable distance. Because this makes it difficult to adequately enable the panic function, it is preferred that operation be possible even at a location distant from the vehicle. Additionally, it is conceivable that the above-described potential aggressor may retaliate and inflict damage or injury in response to enablement of the panic. To avoid such a situation it is preferred that operation be possible from as distant a location as possible.

In this way, an optimal distance is established for the functions (1) through (4) which have been described from the standpoint of respective operable distances from the transmitter 1 to the receiver 2. Consequently, when specifying the execution of this plurality of functions with a radio-wave transmission from a single transmitter, the optimal transmission power corresponding to these functions can be obtained.

This invention is not limited only to the above-described embodiments, but may also be embodied in various modes which do not depart from the intended scope of this invention.

For example, in the foregoing description, "control corresponding to number of repetitions of operation" was described with reference to FIG. 2, and "control corresponding to function" was described with reference to FIG. 4. It is possible to execute only one or the other these methods of control by hardware or software modification according to the structure of the transmitter 1 shown in FIG. 1. However, it should be appreciated that both can be executed while maintaining an alternating relationship.

That is to say, when operation to select, for example, door locking is performed with the operation switch 11, according to the "control corresponding to function," the set-voltage value corresponding to the door-lock function is read from the corresponding-voltage memory portion 123, and this set-voltage value is output to the DAC 12b. Consequently, the remote-control signal is sent with a transmission power corresponding to this set-voltage value. Accordingly, in a case when the same operation is repeated, the transmission power can be further increased by the "control corresponding to number of repetitions of operation."

However, as was also stated in the description of the "control corresponding to function," it is sufficient to be able to perform remote operation in the immediate vicinity of the vehicle. Conversely, when operation is possible also at a considerable distance from the vehicle, in a case where the trunk has been opened because of erroneous operation or the like, the possibility exists that the car may be driven off without it being noticed that the trunk has been opened. Consequently, for the trunk-open function, execution which does not increase the transmission power according to the "control corresponding to number of repetitions of operation" can be said to be preferred.

Additionally, with the above-described embodiment, the receiver 2 and the ECU 3 were indicated as separate bodies and a structure communicating in an alternating manner through the communication interfaces 25 and 31 was adopted. However, the receiver 2 itself may be provided with a drive-control unit 33 or the like, to output a drive signal to the vehicle-mounted apparatus 4 based on a functional code obtained by analyzing a received remote-control signal.

What is claimed is:

1. A keyless entry system transmitter configured for remotely operating a vehicle-mounted apparatus, the apparatus including a plurality of functions, the transmitter comprising:

a switch configured for selecting a desired function from the plurality of functions;

means for transmitting configured for (i) providing a control signal for transmission to the apparatus, (ii) encoding the control signal with information representative of the selected function and with an identification code, and (iii) transmitting the encoded signal;

means for regulating an operating voltage of the transmitting means, the encoded signal being responsive to the operating voltage; and means for controlling the regulating means, the means for controlling the regulating means automatically varying the operating voltage in accordance with the information representative of the selected function.

2. The transmitter of claim 1, wherein the information representative of the selected function includes a number of repetitions of the selected function and data corresponding to the desired function.

3. The transmitter of claim 1, wherein the selected function is a door lock/unlock function, a trunk-open function, a car-finder function, or a panic function;

the controlling means causes the regulating means to output the operating voltage at a door lock/unlock level when a door lock/unlock function has been specified;

the controlling means causes the adjusting means to reduce the operating voltage from the door lock/unlock level when the trunk-open function has been specified; and the controlling means causes the adjusting means to increase the operating voltage from the door lock/unlock level when the car-finder function or panic function has been specified.

4. The transmitter of claim 1, wherein the operation switch correlates the vehicle-mounted apparatus and the information representative of the selected function and the identification code.

5. The transmitter of claim 1, further comprising:

a vehicle-mounted receiver that receives the transmitted encoded signal; and means for controlling operation of the receiver in correspondence with the information representative of the selected function and the identification code in the transmitted encoded signal.

6. The transmitter of claim 5, wherein a transmitter-specific code is also converted and transmitted in the encoded signal from the transmitter;

the receiver receives and analyzes the encoded signal, and determines whether the transmitter-specific code contained in the signal coincides with a code for determination use stored in the receiver; and the receiver operation controlling means operates only when both the transmitter-specific code and the code for determination use coincide.

7. A keyless entry system transmitter configured for remotely operating one of a plurality of vehicle-mounted devices, each device having a number of associated functions, the transmitter comprising:

a switch configured for selecting a desired function;

a transmitting unit configured for (i) providing a control signal for transmission to the apparatus, (ii) encoding the control signal with an information code representative of the selected function and representative of a switch operating state;

a voltage regulator configured for receiving a power source voltage and providing a regulated power source voltage to the transmitting unit, the encoded signal being responsive to the regulated power source voltage; and a controller configured for controlling the voltage regulator, the controller automatically varying the power source voltage according to the information code in the encoded signal.

8. The transmitter of claim 7, wherein at least one among a door-lock/unlock function, a trunk-open function, a car-finder function, and a panic function is established as a function which can be specified by the operation switch; and the controller sets the power source voltage at a level associated with the door lock/unlock function when the door lock/unlock function has been specified, the controller reduces the power source voltage from the level associated with the door lock/unlock function when the trunk-open function has been specified, and increases supply voltage from a level associated with the door lock/unlock function when the car-finder function or the panic function has been specified.

9. The transmitter of claim 7, further comprising:

a vehicle-mounted receiver that receives the encoded signal from the transmitter; and a vehicle-mounted controller that causes the vehicle-mounted receiver to operated in correspondence with the information in the received encoded signal.

10. The transmitter of claim 9, wherein a transmitter-specific code is also provided and encoded in the control signal transmitted from the transmitter;

wherein the receiver is configured for (i) receiving and analyzing the encoded signal from the transmitter and (ii) determining whether the selected transmitter-specific code coincides with an identification code for determination use stored in the receiver; and wherein the vehicle-mounted controller causes the receiver to operate in correspondence with the information code in the encoded signal when the identification codes coincide.

11. A transmitter for a keyless entry system, comprising:

a controller configured for storing identification information and operating state information for remotely operating at least one vehicle-mounted apparatus;

a transmitter unit configured for selective operation by the controller in order to transmit the stored identification and operating state information;

a switch configured for communication with the controller to identify the vehicle-mounted apparatus, and to cause the controller to provide the stored identification and operating state information to the transmitter;

a voltage regulator configured for regulating a voltage supplied to the transmitter unit;

wherein the controller is operative to automatically adjust the supplied voltage in accordance with switch operating parameters; and wherein the controller increases the supply voltage in accordance with a count of repeated operations of the switch.

12. The transmitter of claim 11, wherein the controller resets the count when a predetermined time elapses for operation of the switch.

13. A transmitter for a keyless entry system, comprising:

a controller including stored identification and operating state information associated with remote operation of at least one vehicle-mounted apparatus;

a transmitter unit configured for being selectively instructed by the controller to transmit the stored information;

a switch electrically coupled to controller and configured to (i) identify the vehicle-mounted apparatus and (ii) cause the controller to provide the stored information to the transmitter;

a voltage regulator configured for regulating a voltage supplied to the transmitting unit;

wherein the controller is operative to automatically adjust the supplied voltage in accordance with switch operating parameters; and wherein the controller increases a level of the supplied voltage to rise in accordance with a continuous time period of operation for the switch, the level of supplied voltage increasing in a stepwise manner at predetermined time intervals during the continuous time period of operation.

14. The transmitter of claim 11, wherein the controller inhibits an increase in the supply voltage when the supply voltage from the voltage regulator has reached a predetermined upper-limit value.

* * * * *